(12) United States Patent
Mori et al.

(10) Patent No.: US 7,607,618 B2
(45) Date of Patent: Oct. 27, 2009

(54) CABLE CLIP FOR ORGANIZING AND ROUTING CABLES AND WIRES

(75) Inventors: Kenneth Mori, Los Angeles, CA (US); Dale Tadashi Honda, Torrance, CA (US)

(73) Assignee: Belkin International, Inc., Compton, CA (US)

( * ) Notice: Subject to any disclaimer, the term of this patent is extended or adjusted under 35 U.S.C. 154(b) by 0 days.

(21) Appl. No.: 11/563,924

(22) Filed: Nov. 28, 2006

(65) Prior Publication Data

US 2008/0121763 A1 May 29, 2008

(51) Int. Cl.
*F16L 3/22* (2006.01)

(52) U.S. Cl. ............... 248/68.1; 248/51; 52/685; 404/136

(58) Field of Classification Search ............... 248/68.1, 248/71, 51, 205.8, 74.2; 24/388, 405.2, 561; 24/129 R, 135 R, 16 R; 52/719, 685, 686; 404/136; 242/388, 405.2
See application file for complete search history.

(56) References Cited

U.S. PATENT DOCUMENTS

| | | | | |
|---|---|---|---|---|
| 1,070,921 A * | 8/1913 | Saltiel | ............... | 52/686 |
| 2,266,340 A * | 12/1941 | Sindlinger | ............... | 174/175 |
| 2,746,112 A * | 5/1956 | Simon | ............... | 24/129 B |
| 3,255,565 A * | 6/1966 | Menzel | ............... | 52/678 |
| 3,368,320 A * | 2/1968 | Lowery | ............... | 52/684 |
| 3,623,289 A * | 11/1971 | Lowery | ............... | 52/309.1 |
| 4,405,827 A * | 9/1983 | Mixon, Jr. | ............... | 174/94 R |
| 4,575,985 A * | 3/1986 | Eckenrodt | ............... | 52/677 |
| 4,597,690 A * | 7/1986 | Girard | ............... | 403/391 |
| 5,699,591 A * | 12/1997 | Kane | ............... | 24/304 |
| 5,713,546 A * | 2/1998 | Auspos | ............... | 248/156 |
| 6,009,680 A * | 1/2000 | Mathews | ............... | 52/665 |
| 6,282,860 B1 * | 9/2001 | Ramirez | ............... | 52/677 |
| 6,431,500 B1 * | 8/2002 | Jacobs et al. | ............... | 248/51 |
| 6,576,842 B2 * | 6/2003 | Ishii | ............... | 174/84 R |
| 6,648,281 B1 * | 11/2003 | Lake | ............... | 248/75 |
| 6,925,771 B2 * | 8/2005 | Lee et al. | ............... | 52/685 |
| 6,962,029 B2 * | 11/2005 | Lowery et al. | ............... | 52/682 |
| 7,077,693 B1 * | 7/2006 | Symons | ............... | 439/501 |

* cited by examiner

*Primary Examiner*—Anita M King
(74) *Attorney, Agent, or Firm*—O'Melveny & Myers LLP

(57) ABSTRACT

A system and apparatus are provided for managing cables, wires, and cords, and more particularly, to organize and route cables and wires in various directions. For example, there is provided an apparatus comprising: a cable clip with a rigid circular base and a flexible dome-shaped head, wherein the base includes a central aperture and an adhesive layer covered by a protective film on one side and is integrated with the dome-shaped head on the other side. The dome-shaped head has a plurality of slots that extend radially across the head and intersect with one another, forming an opening. In one embodiment, each slot has circular shaped arcuate openings on opposites sides creating first and second transit paths for a cable or wire. The resulting dome-shaped head has a plurality of retaining arms that receive cables, retains them, and can be attached to a surface by a variety of methods.

32 Claims, 5 Drawing Sheets

CABLE CLIP FOR ORGANIZING AND ROUTING CABLES AND WIRES

BACKGROUND OF THE INVENTION

1. Field of the Invention

The present invention is directed toward an apparatus for managing cables, wires, cords, and the like, and more particularly, to a cable clip for organizing and routing cables and wires in various directions.

2. Description of Related Art

The tangling and disarray of cords and wires associated with computers, appliances, and other machines is all too common. Anyone who has tried to set up a computer and all accessories knows that separating the wires is a burdensome task. Once they are detangled, maintaining order is also challenging. Similarly, the wires attached to other devices, such as cellular phones, rechargers, PDA's, etc. are also difficult to manage. Inherent in the organization and management of wires, is the need to route them in a desired direction or path.

There are many products available that assist in organizing, managing and routing wires. These products vary in form and composition. The simplest cord organizer is the widely used nylon wire tie, having a head and a pawl that loops around the wires. A general-purpose nylon wire tie can group wires together and when used in conjunction with an adhesive backed mounting base, it can be used to anchor wires to a flat surface. However, a typical general-purpose nylon wire tie cannot be reused, because the head is self-locking and once the pawl is inserted into the head it is locked in and is cut off in order to remove the wire tie. A releasable cable tie has interlocking teeth along its pawl and is adjusted by depressing a tab connected to the head. The releasable cable tie can be reused, however, it is generally not compatible with an adhesive backed mounting base and thus cannot anchor wires to a flat surface.

Cord clips are another commercially available product used for organizing cables. Generally, cord clips have an adhesive backed base and a retaining arm designed to hold cords. The use of a cord clip is advantageous over a releasable cable tie, in that the cord clip can attach cords to a flat surface in addition to organizing them. Additionally, cord clips that have thicker retaining arms are advantageous over general-purpose ties, as they partially cover the cords, thus allowing for slightly more stable positioning. However, cord clips are often very small and flimsy, and cannot hold large cords or cables. Also, cord clips are difficult to handle, in that the rounded retaining arm of the clip is made of rigid plastic and a has a small range of motion. This rigid structure can only be raised a rather limited amount and the cables inserted in the clip invariably are smaller in diameter than that of the clip. A cable that is slightly larger than the cord clip would have to be forced in to the clip, likely resulting in damage to the cable or breaking of the cord clip.

Known cord organizers have mountable bases with hooks or channels that allow for turning and looping cords. For example, one known organizer has multiple swivel hooks aligned along the top and bottom of the base that allow for the cords to be wrapped around them, but has at least two drawbacks. Firstly, each hook extends straight up or down. Because they do not curve around the cord, they fail to encase the cord. If a long cord is not wrapped around the hooks tightly or if it is tugged at and the tension is released, the cord will easily unwind and will tangle. Secondly, these swivel hooks can become loosened over time and break off, once again, causing the cord to unwind. The organizer is generally very bulky and is intended to be used in clinical settings for medical machine cords. It is not intended to route wires.

Another known cord organizer has a base with channels and posts designed to receive cables and loop them along the base. This product makes it possible to run wires in parallel channels along the base plate. However, the channels and posts are rigid in their design and are thus too limiting in terms of the cables they can hold. Moreover, this product does not route cables. Instead, the channels that extend from the base are designed to have the cables pass through them and loop around the posts in order to organize the cables.

Thus, the various cord organizers described above fail to route cables, wires, and cords at a desired angle. Further, because these cord organizers are designed merely to bunch wires together, they fail in directing a wire in a particular path. Although multiple products can potentially be used in conjunction with each other to direct a wire or cord at a particular angle, this is far too cumbersome and aesthetically unpleasant.

For each of the foregoing reasons, a need exists for a product that provides for convenient organization and management of cables, wires, and cords and is designed to manage cables of varying sizes securely, allowing for stable grounded routing in a desired angle, without damaging them.

SUMMARY OF THE INVENTION

The present invention provides a cable clip for organizing, managing and routing wires that overcomes the aforementioned drawbacks of the prior art. The cable clip includes a head for routing one or more cables in three or more directions and has a rigid base. In one embodiment, the head comprises a flexible dome-shaped head and the base is circular in shape. The dome-shaped head includes a first slot that extends radially across the dome-shaped head and is perpendicular to a second slot that extends radially across the dome-shaped head, each slot having arcuate openings of a circular shape on opposing ends. Each arcuate opening provides an entry or exit point for a cable or wire and each slot is a transit path for the same. The first slot with arcuate openings has larger arcuate openings then the second slot with arcuate openings. The two slots and four arcuate openings result in four retaining arms having a rounded contour that encase and maintain wires in the dome-shaped head. Because the dome-shaped head is made of a flexible material, the retaining arms allow for convenient entry and exit for cables of varying sizes, as well as removal and reinsertion of the cables without destruction of the invention. It should be appreciated that a different number of slots and arcuate openings as well as different sized slots and different shaped arcuate openings could also be advantageously utilized in order to vary the number, size and directions of cables that could be routed using a single cable clip.

The cable clip can be mounted to a flat surface from its circular base. In a first embodiment of the invention, the cable clip can be affixed to a flat surface using an adhesive layer covering the circular base. In another embodiment of the invention, a screw can be inserted through the central aperture of the circular base in order to attach the cable clip to a wall or desk using a drill or similar device. In yet another embodiment of the invention, a friction fit pin can be inserted into the central aperture of the circular base in order to affix the cable clip into a hole, such as in a wall or desk. Finally, all three embodiments can be incorporated into one cable clip, in which the adhesive layer is covered by a protective film. This allows the user to have the option of peeling off the protective film to use the adhesive layer, or keeping the protective film intact in order to use either a screw or friction fit pin to attach the cable clip to a flat surface.

A more complete understanding of the cable clip will be afforded to those skilled in the art, as well as a realization of additional advantages and objects thereof, by a consideration of the following detailed description of at least three embodiments. Reference will be made to the appended sheets of drawings that will first be described briefly.

DETAILED DESCRIPTION OF THE PREFERRED EMBODIMENT

The present invention provides a cable clip for organizing and routing cables, wires and the like. More particularly, the present invention satisfies the need for a product that provides for convenient organization of wires and that is also designed to route wires of varying sizes securely, allowing for stable grounded routing at a desired angle, with no damage to the wires. In the detailed description that follows, like element numerals are used to describe like elements shown in one or more of the figures.

Figure 1:
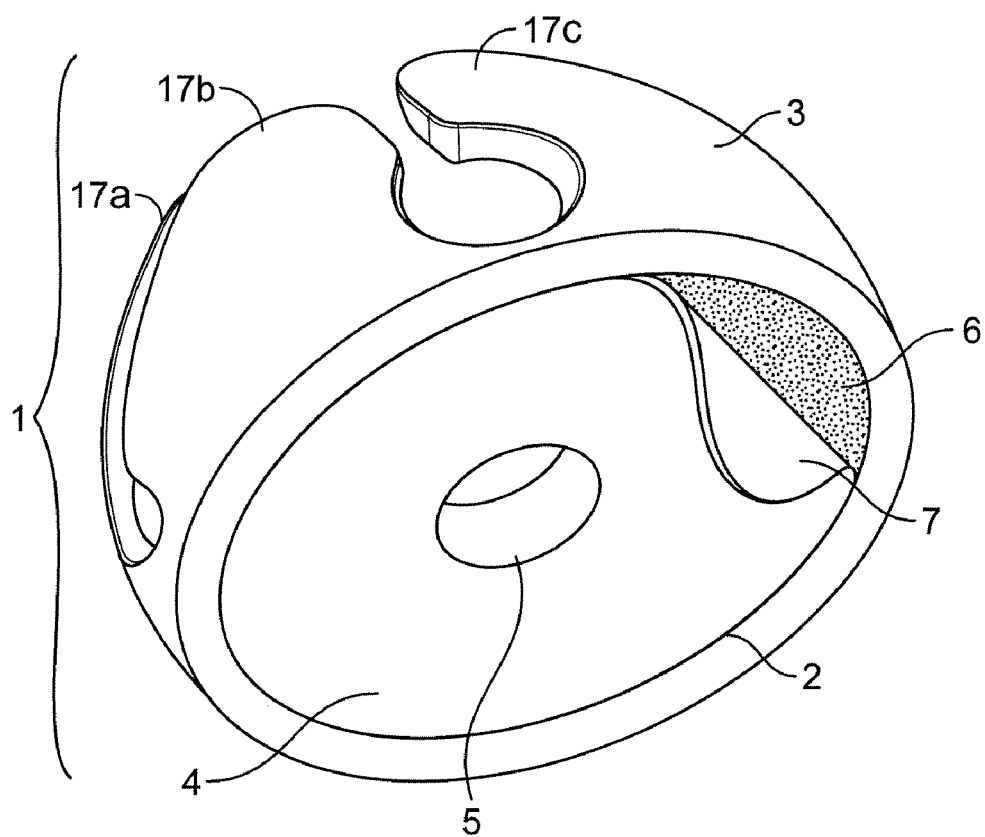
FIG. 1 is an perspective view of an exemplary cable clip having a circular base covered with an adhesive layer and a peel-off protective film.
Figure 2:
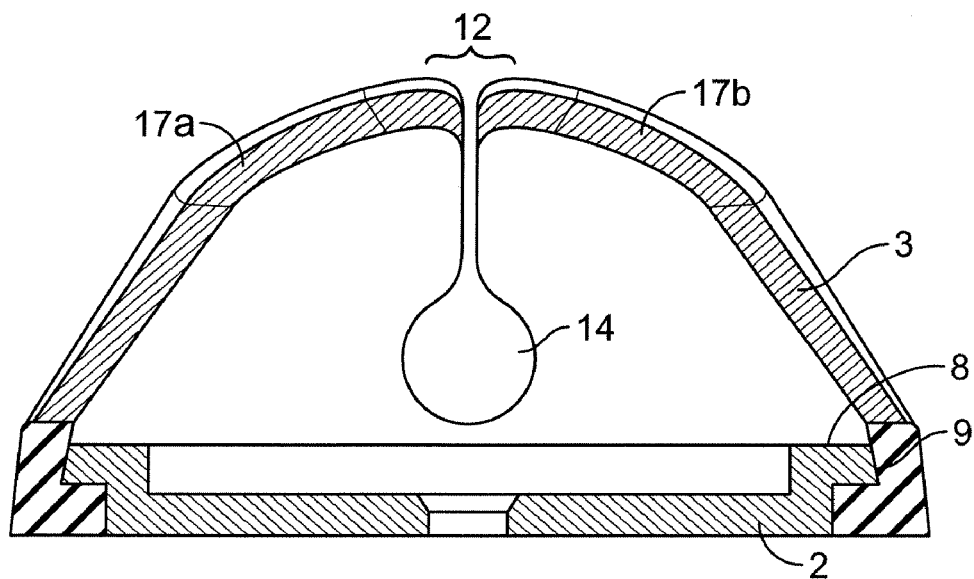
FIG. 2 is a cross-sectional view of the exemplary cable clip of FIG. 1 and illustrates the circular base affixed to a dome-shaped head.

FIG. 1 provides an perspective view of a cable clip 1. The cable clip 1 includes a generally circular base 2 made from a rigid material and in one embodiment, a dome-shaped head 3 made from a flexible material. The circular base 2 has a generally flat back surface 4 with a central aperture 5. In one embodiment, the underside of the back surface 4 may include an adhesive layer 6 for permanent or releasable attachment of the cable clip 1 to a corresponding flat surface such as a wall or desk. The adhesive layer 6 is covered by a protective film 7 that can be peeled off when ready for use. FIG. 2 is a cross-sectional view of the cable clip 1. The rigid circular base 2 is permanently affixed to the bottom 8 of the flexible dome-shaped head 3 during the manufacturing process by either injection molding, creating one unitary structure, or by permanent adhesive. As illustrated in FIGS. 1 and 2, the flexible dome-shaped head 3 extends downward from the top portion and at the bottom portion, encircles the outer perimeter 9 of the circular base 2, thereby enclosing the circular base 2. One skilled in the art will appreciate that the head of the cable clip is not limited to being dome-shaped. Instead, in other embodiments the cable clip includes a head for routing one or more cables in three or more directions.

Figure 3:
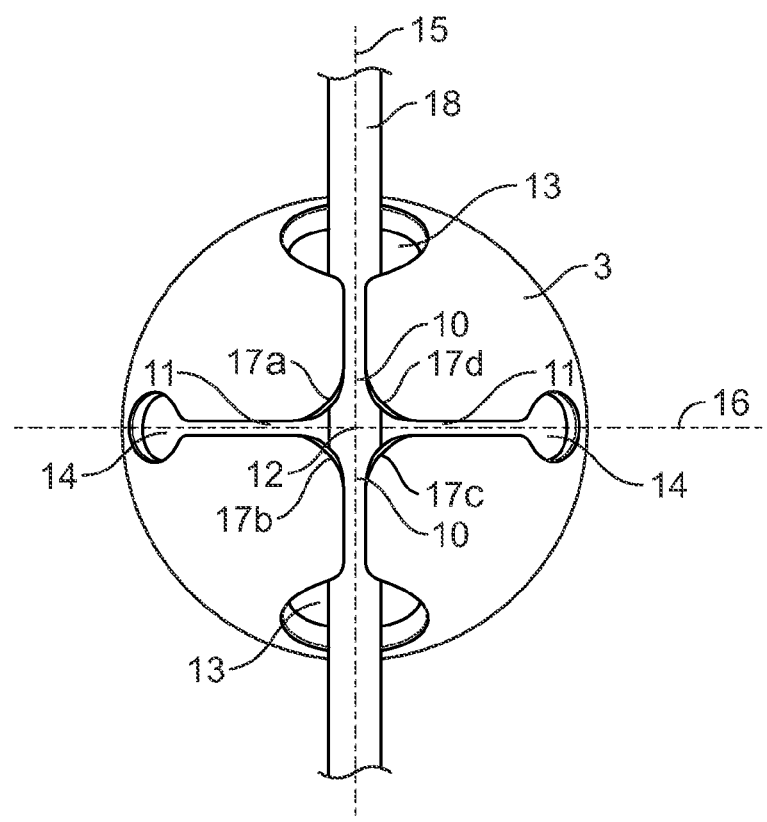
FIG. 3 is a top view of the cable clip and illustrates two possible transit paths for a single cable through the dome-shaped head of the cable clip.

FIG. 3 illustrates a top view of the exemplary cable clip 1. The flexible dome-shaped head 3 has a first slot 10 that extends radially along the dome-shaped head 3 and a second slot 11 that extends radially along the dome-shaped head 3, although offset circumferentially from the first slot 10 by roughly 90° forming an opening 12 at the top of the dome-shaped head 3 (see FIG. 2). Furthermore, the first and second slots 10, 11 form arcuate openings 13, 14 on opposite sides of the dome-shaped head 3 and provide first and second transit paths 15, 16. Arcuate opening 13, 14 are circular in shape, with the diameter of arcuate opening 13 being approximately twice that of acruate opening 13. This allows once cable clip to be utilized with varying sizes of cables or wires. The resulting dome-shaped head 3 has four retaining arms 17a-17d, that extend up from the circular base 2 towards the center of the dome-shaped head 3 and correspond with the opening 12 at the top of the dome-shaped head 3. It should be appreciated that a different number of slots and arcuate openings as well as different sized slots and different shaped arcuate openings could also be advantageously utilized in order to vary the number, size and directions of cables that could be routed with the cable clip.

Figure 4:
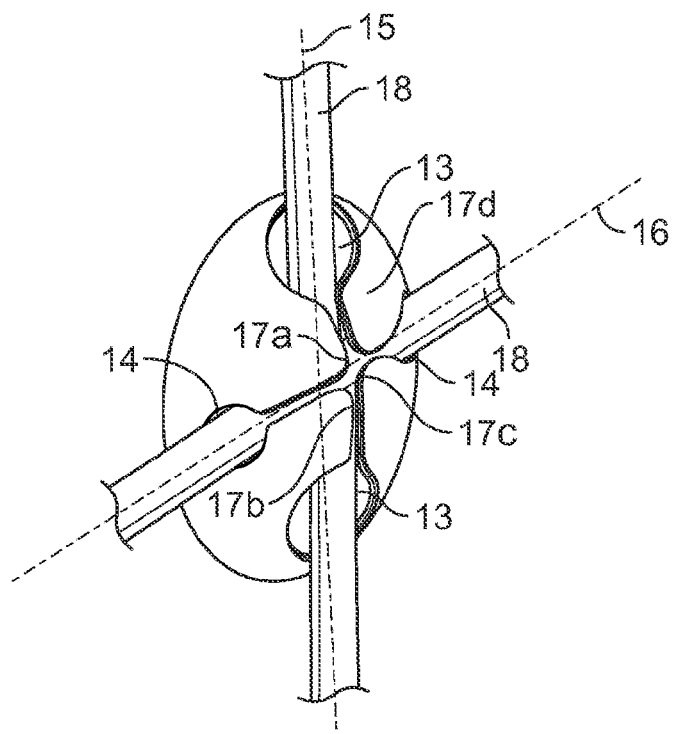
FIG. 4 is a side view of the cable clip and illustrates two transit paths for multiple cables through the dome-shaped head of the cable clip.

Referring now to FIG. 4, the cable clip 1 is intended to engage a cable, wire or the like. A cable 18 can enter the cable clip 1 from any of the arcuate openings 13, 14, travel across the transit paths 15, 16 and exit from the opposite arcuate openings 13, 14, with arcuate opening 14 accommodating larger diameter cables than arcuate opening 13. Additionally, a cable 18 can be inserted into the cable clip 1 from the opening 12 at the top of the dome-shaped head 3, as the flexible retaining arms 17a-17d allow for the opening 12 to expand to receive a cable 18 by flexing outward. Furthermore, the retaining arms 17a-17d are intended to maintain the cable 18 in the dome-shaped head 3 by flexing back to their original position, thus providing for easy ingress and egress for the cable 18. The retaining arms 17a-17d also provide enclosure for the cable 18.

Figure 5:
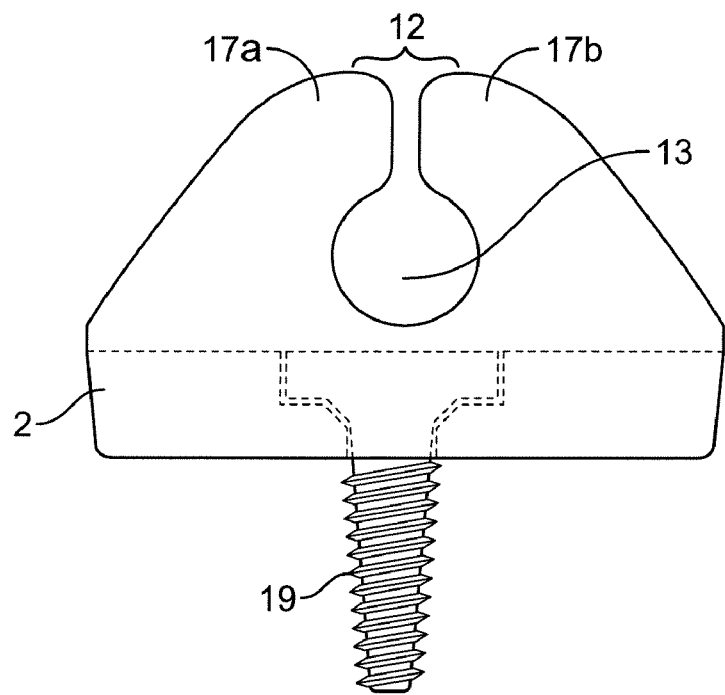
FIG. 5 illustrates a screw coupled to the cable clip that is used to screw the cable clip to a flat surface.
Figure 6:
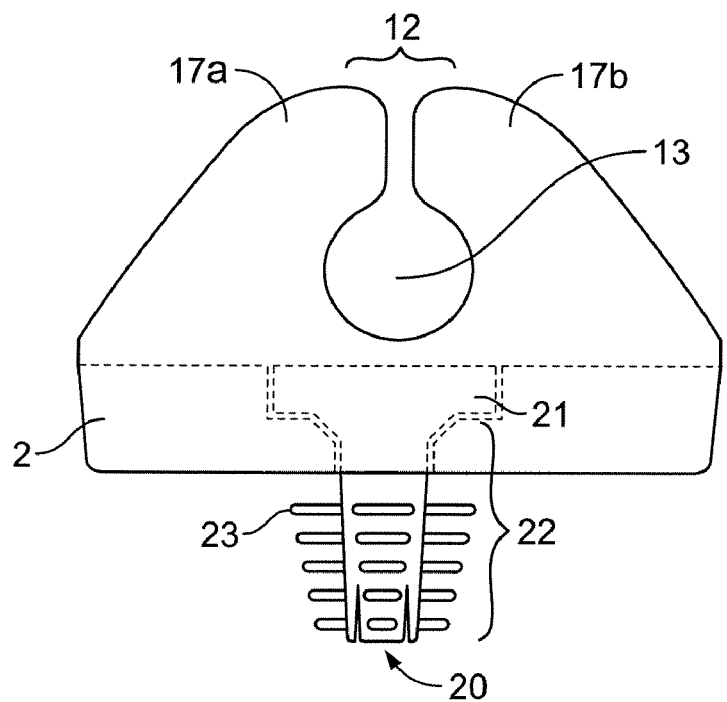
FIG. 6 illustrates a friction fit pin coupled to the cable clip that is used to affix the cable clip to a flat surface.

In one embodiment of the present invention, the cable clip 1 can be attached to a flat surface by peeling off the protective film 7 (see FIG. 1) and attaching the cable clip 1 to the flat surface (e.g., wall, desk, table, etc.) with the adhesive layer. In another embodiment of the present invention, a screw 19 can be inserted through the central aperture 5 of the circular base 2 of the cable clip 1, as illustrated in FIG. 5. Thus, the cable clip 1 can be securely attached to an object that is made of wood (e.g., wall, desk, table or other furniture item) by using a screw 19. This provides for a stable clip that will securely hold a cable 18. In yet another embodiment of the present invention, the cable clip 1 can be affixed to a surface (e.g., wall, table, desk, etc.) using a friction fit pin 20. Referring now to FIG. 6, a friction fit pin 20 is attached to the cable clip 1 by being inserted through the central aperture 5 of the circular base 2. The friction fit pin 20 has a head portion 21 that is bigger than the central aperture 5 of the circular base 2 and allows for the friction fit pin 20 to attach to the circular base 2. The friction fit pin 20 has a tail end portion 22 with multiple tabs 23. The tail end 22 of the friction fit pin 20 can be inserted into a hole in a surface (e.g., wall, table, desk, etc.), wherein the cable clip 1 will be securely held in place by the multiple tabs 23 in conjunction with the friction fit pin 20. It should be appreciated that other sizes and shapes of screw 19 and friction fit pin 20 could be routed using the cable clip 1 for a particular application.

The above-described three embodiments can be incorporated into one cable clip 1, in which the protective film 7 covers the adhesive layer 6. This allows the user to have the option of peeling off the protective film 7 to use the adhesive layer 6, or keeping the protective film 7 intact in order to use either a screw 19 or a friction fit pin 20 to attach the cable clip to a flat surface.

Figure 7:
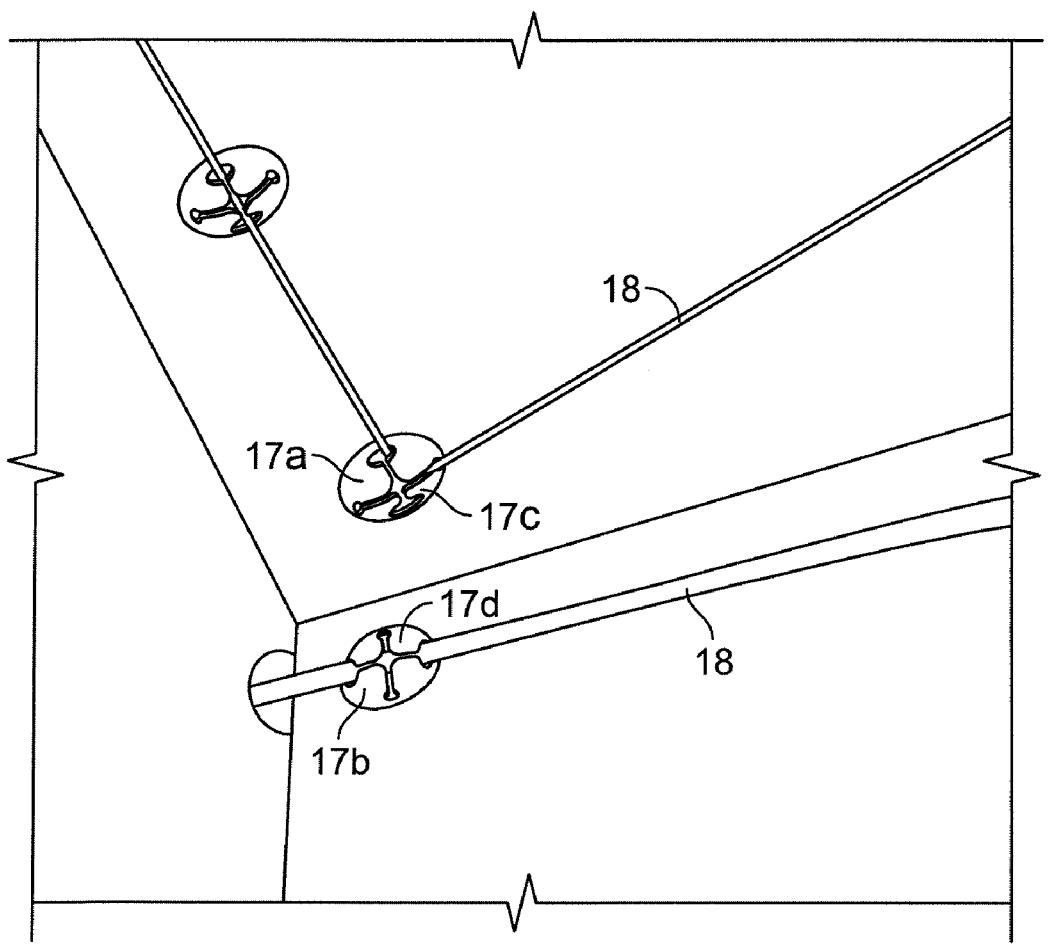
FIG. 7 illustrates an exemplary use of the cable clip for routing cables and wires along a straight path on a wall and a second exemplary use of the cable clip for routing cables and wires in a ninety-degree direction, around a corner, on a ceiling.
Figure 8:
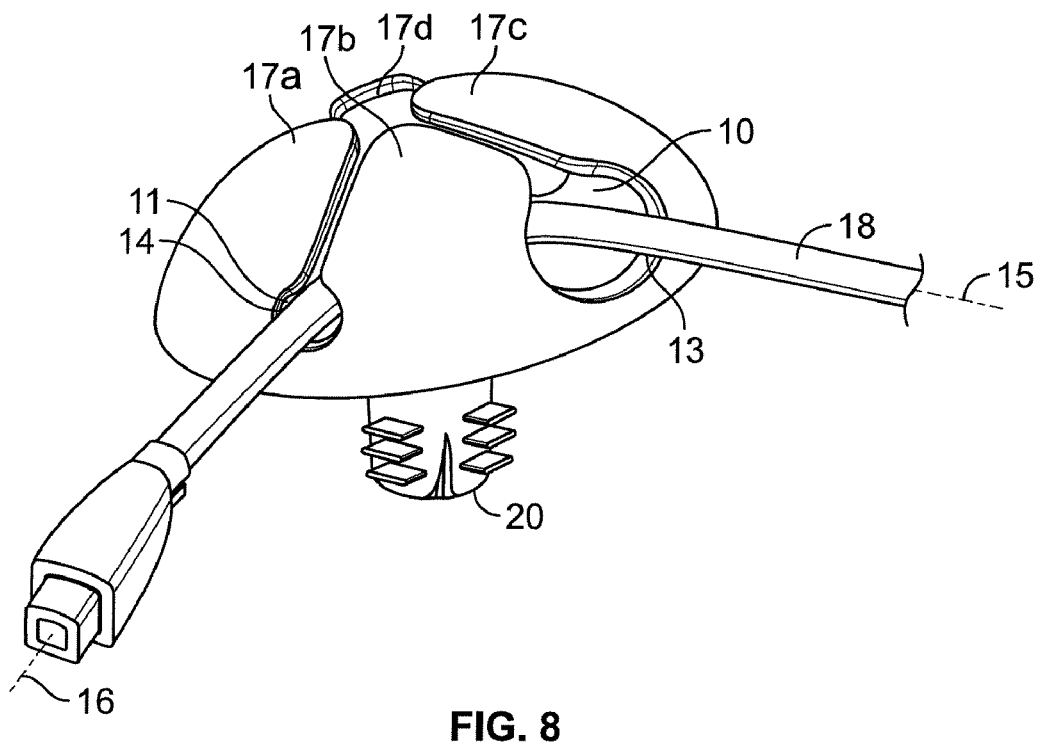
FIG. 8 further illustrates an exemplary use of the cable clip for directing a cable or wire in an approximate ninety-degree direction.

The present invention can be used for multiple purposes. In addition to organizing cables and wires, the cable clip 1 can also route and manage wires. FIG. 7 illustrates the use of the cable clip 1 as a way to route wires along a wall and ceiling in a desired direction or path. As shown in FIG. 7, multiple cable clips 1 can be used to route wires in either a straight path or at an angle in a corner. Thus, the present invention allows for easy routing of a cable 18 at approximately 90 degrees. This is further illustrated in FIG. 8. A cable 18 can enter the first slot 10 through one arcuate opening 13 along the first transit path 15, be directed into the second slot 11 by being turned roughly 90 degrees, and can then exit the cable clip 1 out of the adjacent arcuate opening 14, having passed through the second transit path 16. In this instance, the retaining arm 17*b* between the adjacent arcuate openings 13 and 14 will securely hold the cable 18 in place. It should be appreciated that other angles between the transit paths could be used as desired for a particular application.

Cable clip 1 can also be used to take-up excess slack in a cable or cord by looping the cable several times back and forth between arcuate openings 13 and 14 (not shown) or looping a cable or cord back upon itself and inserting the looped cable or cord into slot 10 or slot 11 (not shown).

Figure 9:
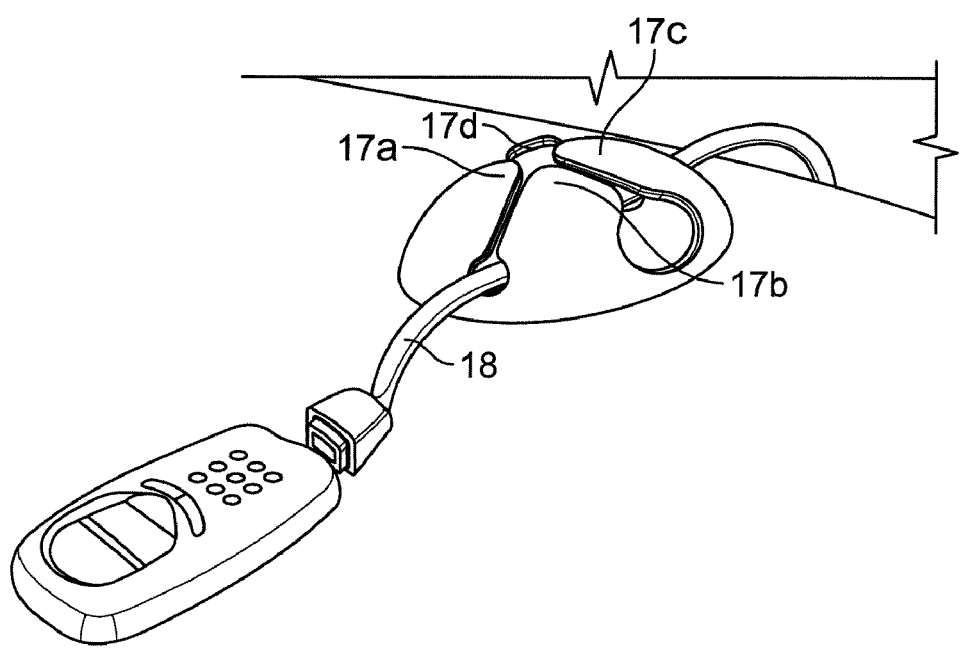
FIG. 9 another exemplary use of a cable clip as a cable plug end, for holding the ends of loose cables.

Yet another use of the cable clip 1 is illustrated in FIG. 9. Here, the cable clip 1 can be attached to a flat surface by any of the attachment methods described above and a cord or cable 18, for example one that is attached to a cellular phone charger, can be managed by the cable clip 1. The cable clip 1 is thus used as a cable plug end, allowing for the cable to sit on top of the desk when the cellular phone is not attached to its charging cable. This eliminates the nuisance of the charging cable falling to the floor and allows for convenient and easy accessibility to the charging cable 18. Here the cable clip 1 is primarily used to hold a cord or cable in place and is advantageous over the prior art described above, because it eliminates the need to wind the cable around a spool.

It is readily apparent that the present invention solves the problems posed by the prior art and overcomes their disadvantages. The flexible dome-shaped head 3 of the cable clip 1 has multiple advantages, in that it is intended to receive larger cables and wires, encloses them thereby protecting the wires and also allows for convenient ingress and egress. Unlike nylon wire ties, cables and wires can be inserted and removed from the present invention multiple times without having to destroy the invention. It solves the problems of exposed wires that are simply bunched together with ties and allows for easy entry and encasement of wires, unlike the adhesive back cord clips. It holds the wires safely and securely and eliminates the risk of unwinding and tangling. Unlike the rigid channels and posts of prior art cable organizers, the arcuate openings 13, 14 of the present invention outlined by the flexible retaining arms 17*a*-17*d* are intended to receive larger and/or multiple cables of varying sizes and the flexible material of the retaining arms 17*a*-17*d* do not damage the cables. Moreover, the rigid circular base 2 allows for better anchoring to flat surfaces as compared to the prior art, that utilize thin plastic bases that are generally attached to a flat surface with adhesive pads.

Having thus described several embodiments of a cable clip and system used to organize, manage and routes cables and wires, it should be apparent to those skilled in the art that certain advantages of the within cable clip and system have been achieved. It should also be appreciated that various modifications, adaptations, and alternative embodiments thereof may be made within the scope and spirit of the present invention. It should be apparent that many of the inventive steps described above would be equally applicable to other cable clips with various numbers and sizes of arcuate openings on the cable clip head, as well as heads with other than a dome-shape.

What is claimed is:

1. A cable clip, comprising:
    a substantially flat base along a bottom of the cable clip, the substantially flat base comprising a central aperture; and
    a dome-shaped, flexible head for routing at least one cable in at least three defined directions, the dome-shaped, flexible head extending downward from a top portion to a bottom portion, the bottom portion encircling the outer perimeter of the substantially flat base, the dome-shaped, flexible head further comprising:
       a first slot that extends radially along the bottom of the dome-shaped, flexible head, the first slot comprising a first set of arcuate openings on opposite sides of the dome-shaped, flexible head to receive and provide a first transit path for at least one cable; and
       a second slot that extending radially along the bottom of the dome-shape, flexible head, the second slot comprising a second set of arcuate openings on opposite sides of the dome-shaped, flexible head to receive and provide a second transit path for the at least one cable, wherein the first slot is offset from the second slot to define an intersection opening at the top of the dome-shape, flexible head adapted to engage the at least one cable, and wherein the intersection opening comprises a plurality of retaining arms adapted to retain the at least one cable and adapted to move in at least first and second directions in response to the engagement of the at least one cable, the first direction being orthogonal to the substantially flat base and the second direction being parallel to the substantially flat base.

2. The cable clip of claim 1, wherein the substantially flat base comprises a rigid material.

3. The cable clip of claim 1, wherein the substantially flat base further comprises an adhesive layer.

4. The cable clip of claim 1, wherein the second set of arcuate openings comprise a smaller diameter than the first set of arcuate openings.

5. The cable clip of claim 1, wherein the central aperture of the substantially flat base is configured to engage a screw for releasably attaching the cable clip to a surface.

6. The cable clip of claim 1, wherein the central aperture of the substantially flat base comprises a friction fit pin affixed to the cable clip through the central aperture.

7. The cable clip of claim 6, wherein the friction fit pin comprises one or more tabs to anchor the cable clip to a mounting surface.

8. The cable clip of claim 1, wherein the substantially flat base has a generally circular shape.

9. The cable clip of claim 1, wherein the first slot and second slot intersect at an angle of approximately 90 degrees.

10. A system for organizing cables comprising:
    at least one cable and
    a cable clip, comprising:

a substantially flat base along a bottom of the cable clip, the substantially flat base comprising a central aperture; and a dome-shaped, flexible head for routing the at least one cable in at least three defined directions, the dome-shaped, flexible head extending downward from a top portion to a bottom portion, the bottom portion encircling the outer perimeter of the substantially flat base, the dome-shaped, flexible head further comprising:

a first slot that extends radially along the bottom of the dome-shaped, flexible head, the first slot comprising a first set of arcuate openings on opposite sides of the dome-shaped, flexible head to receive and provide a first transit path for the at least one cable; and a second slot that extends radially along the bottom of the dome-shaped, flexible head, the second slot comprising a second set of arcuate openings on opposite sides of the dome-shaped, flexible head to receive and provide a second transit path for the at least one cable, wherein the first slot is offset from the second slot to define an intersection opening at the top of the dome-shaped, flexible head adapted to engage the at least one cable, and wherein the intersection opening comprises a plurality of retaining arms adapted to retain the at least one cable and adapted to move in response to the engagement of the at least one cable, the move comprising a first component orthogonal to the substantially flat base and a second component parallel to the substantially flat base.

11. The system of claim 10, wherein the at least one cable comprises a first cable that traverses the first slot along the first transit path.

12. The system of claim 11, wherein the at least one cable is looped back upon itself, traversing the first transit path a plurality of times before exiting the cable clip along the first transit path.

13. The system of claim 10, wherein the at least one cable comprises one of a first cable that traverses the first slot along the first transit path and a second cable that traverses the second slot along the second transit path.

14. The system of claim 11, wherein the at least one cable traverses the second slot along the second transit path.

15. The system of claim 10, wherein the substantially flat base comprises a rigid material.

16. The system of claim 10, wherein the substantially flat base further comprises an adhesive layer.

17. The system of claim 10, wherein the second set of arcuate openings comprise a smaller diameter than the first set of arcuate openings.

18. The system of claim 10, wherein the central aperture of the substantially flat base is configured to engage a screw for releasably attaching the cable clip to a surface.

19. The system of claim 10, wherein the central aperture of the substantially flat base comprises a friction fit pin affixed to the cable clip through the central aperture.

20. The system of claim 19, wherein the friction fit pin comprises one or more tabs to anchor the cable clip to a mounting surface.

21. The system of claim 10, wherein the substantially flat base has a generally circular shape.

22. The system of claim 10, wherein the first slot and second slot intersect at an angle of approximately 90 degrees.

23. A cable clip, comprising:

a substantially flat base along a bottom of the cable clip; and a dome-shaped head, the dome-shaped head extending downward from a top portion to a bottom portion, the bottom portion encircling the outer perimeter of the substantially flat base, the dome-shaped head further comprising:

a first slot that extends radially along the bottom of the dome-shaped head, the first slot comprising a first set of arcuate openings on opposite sides of the dome-shaped head to receive and provide a first transit path for at least one cable; and a second slot that extending radially along the bottom of the dome-shaped head, the second slot comprising a second set of arcuate openings on opposite sides of the dome-shaped head to receive and provide a second transit path for the at least one cable, wherein the first slot is offset from the second slot to define an intersection opening at the top of the dome-shaped head adapted to engage the at least one cable, and wherein the intersection opening comprises a plurality of retaining arms adapted to retain the at least one cable and adapted to move in at least first and second directions in response to the engagement of the at least one cable, the first direction being orthogonal to said substantially flat base and the second direction being parallel to the substantially flat base.

24. The cable clip of claim 23, wherein the dome-shaped head further comprises a flexible material.

25. The cable clip of claim 23, wherein the substantially flat base comprises a rigid material.

26. The cable clip of claim 23, wherein the substantially flat base further comprises an adhesive layer.

27. The cable clip of claim 23, wherein the second set of arcuate openings comprise a smaller diameter than the first set of arcuate openings.

28. The cable clip of claim 23, wherein the substantially flat base comprises a central aperture and the central aperture of the substantially flat base is configured to engage a screw for releasably attaching the cable clip to a surface.

29. The cable clip of claim 23, wherein the substantially flat base comprises a central aperture and the central aperture of the substantially flat base comprises a friction fit pin affixed to the cable clip through the central aperture.

30. The cable clip of claim 29, wherein the friction fit pin comprises one or more tabs to anchor the cable clip to a mounting surface.

31. The cable clip of claim 23, wherein the substantially flat base has a generally circular shape.

32. The cable clip of claim 23, wherein the first slot and second slot intersect at an angle of approximately 90 degrees.

* * * * *